United States Patent [19]

Lehmann

[11] Patent Number: 5,103,966
[45] Date of Patent: Apr. 14, 1992

[54] CENTRIFUGAL FORCE MATERIAL TRANSFER APPARATUS

[75] Inventor: Richard P. Lehmann, Iron Mountain, Mich.

[73] Assignee: Lake Shore, Inc., Iron Mountain, Mich.

[21] Appl. No.: 456,346

[22] Filed: Dec. 26, 1989

[51] Int. Cl.⁵ .................................................. B65G 47/18
[52] U.S. Cl. ............................................. 198/549; 198/612; 198/642
[58] Field of Search ............................... 198/610–612, 198/642, 601, 509, 549, 713, 714, 638, 690.2, 821, 565, 513; 366/56, 224

[56] References Cited

U.S. PATENT DOCUMENTS

| | | | |
|---|---|---|---|
| 210,769 | 12/1878 | Edwards | 366/224 X |
| 804,022 | 11/1905 | May | 198/565 X |
| 1,125,656 | 1/1915 | Cleveland | 198/612 X |
| 2,006,343 | 7/1935 | Brown | 198/713 |
| 2,155,423 | 4/1939 | Korsmo et al. | 198/612 X |
| 2,816,371 | 12/1957 | Fischer | 366/224 X |
| 2,868,351 | 1/1959 | Hegmann | 198/642 X |
| 3,192,290 | 6/1965 | Polon | 366/224 X |
| 3,253,695 | 5/1966 | Gooding | 198/565 X |
| 3,285,580 | 11/1966 | Renaudette | 198/565 X |
| 3,750,801 | 8/1973 | Karass et al. | 198/611 X |
| 3,876,055 | 4/1975 | Tyznik | 198/513 X |
| 4,534,461 | 8/1985 | Silverthorn et al. | 198/612 X |
| 4,666,032 | 5/1987 | Gough | 198/690.2 X |

FOREIGN PATENT DOCUMENTS

| | | | |
|---|---|---|---|
| 0135065 | 4/1979 | Fed. Rep. of Germany | 198/612 |
| 0025078 | 2/1979 | Japan | 198/638 |
| 1120860 | 7/1968 | United Kingdom | 198/638 |

Primary Examiner—D. Glenn Dayoan
Attorney, Agent, or Firm—Reinhart, Boerner, Van Deuren, Norris & Rieselbach

[57] ABSTRACT

A centrifugal force conveying apparatus for transferring feed material to a conveyor. The transfer conveyor includes a gravity feed chute, a screw conveyor disposed along a longitudinal passage and a rotating paddle wheel which receives the feed material from the screw conveyor. The paddle wheel accelerates the feed material to a prescribed velocity and along a range of predetermined vector directions to enable relatively low differential motion between the feed material and the receiving conveyor system.

16 Claims, 3 Drawing Sheets

CENTRIFUGAL FORCE MATERIAL TRANSFER APPARATUS

BACKGROUND OF THE INVENTION

The present invention is concerned generally with a material transfer conveying apparatus. More particularly the invention is concerned with a material conveying apparatus which receives and accelerates feed material by centrifugal forces to a preselected velocity and along a predetermined range of vector directions. This directionally accelerated feed material is then transferred in a substantially synchronized manner to another moving conveyor system, thereby minimizing erosion and wear of the conveyor system components.

Mining conveyors and such other material handling systems frequently require the transfer of abrasive feed materials from a holding bin, a transport device or a conveyor to another material handling device. In modern conveyor systems, both speed and efficiency requirements of conveyor transfer operations make harsh demands on the conveyor system components. The feed materials are usually coarse, hard materials which are highly abrasive and readily cause rapid wear and breakdown of the components constituting the conveyor system. Typically, these problems have been solved by various means, such as, (1) completely redesigning conveyor systems to avoid and minimize the effect of abrasive material transfer operations, (2) using expensive wear resistant components in the conveyor system, (3) employing complex conveyor drive systems to adjust relative speeds between transferor and transferee conveyors and (4) using robotic pickup devices to synchronize speed and direction of travel of a material feed load to avoid relative displacement of the material transferred to a moving conveyor system.

SUMMARY OF THE INVENTION

It is therefore an object of the invention to provide an improved method and apparatus for material conveying applications.

It is another object of the invention to provide a novel method and apparatus for redirecting feed material from one conveyor system or bin to another by centrifugal displacement of the feed material.

It is a further object of the invention to provide an improved method and apparatus for receiving and accelerating feed material along predetermined vector directions to effectuate a synchronized material transfer along a range of angular orientations.

It is an additional object of the invention to provide a novel method and apparatus for synchronized transfer of feed material from one conveyor or bin to another by a centrifugal force displacement device.

Further objects and advantages of the invention, together with the organization and manner of operation thereof, will become apparent from the following detailed description of the invention when taken in conjunction with the accompanying drawings wherein like reference numerals designate like elements in the several views.

DETAILED DESCRIPTION OF PREFERRED EMBODIMENT

Figure 1:
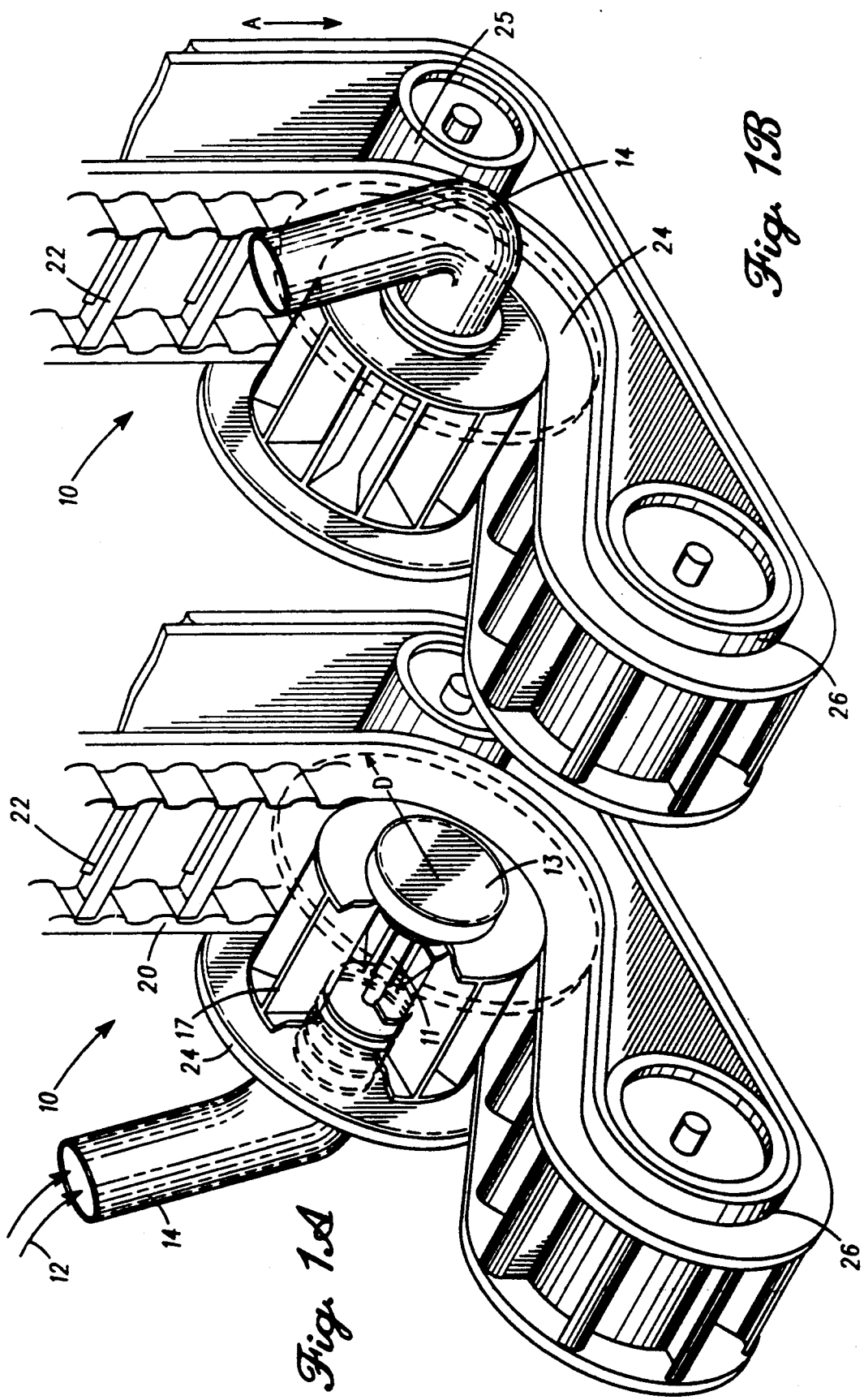
FIGS. 1A and 1B illustrate feed material conveyor systems constructed in accordance with the invention.

Referring now to the drawings and in particular to FIG. 1, an improved material conveyor transfer system constructed in accordance with one embodiment of the invention is indicated generally at 10. The illustrated conveyor transfer system 10 is shown in use with a vertical conveyor system. However, the subject invention is not limited to such applications and can apply to any conveyor system (such as, a horizontal or inclined system) involving a transfer of feed material from one position to another. Feed material 12 (shown schematically) is input to the conveyor transfer system 10 by means for transporting the feed material 12 from a feed source (not shown). Such a transporting means can include, for example, a gravity feed chute 14. The feed chute 14 provides the feed material 12 to an auger or screw conveyor 15. The chute 14 can also input the feed material 12 to an open cylindrical, longitudinal passageway 16, as shown best in FIG. 3. The screw conveyor 15 can be powered by a variable speed electric or hydraulic drive (not shown). Such a drive allows for accurate volume control of input to the conveyor transfer system 10 and also insures uniform loading across the longitudinal passage 16 for various longitudinal widths of the conveyor transfer system 10. Alternatively, the screw conveyor can be driven in conjunction with rotation of the cylindrical end caps 13 to which screw conveyor shaft 11 is fixedly connected. Such a simple feed mechanism results in a regulated flow in that a lower rotational speed for the screw conveyor 15 results in a reduced screw feed rate to the transfer system 10, and the transfer demand by the vertical conveyor for the feed material 12 is also inherently reduced downstream as discussed hereinafter.

Figure 2:
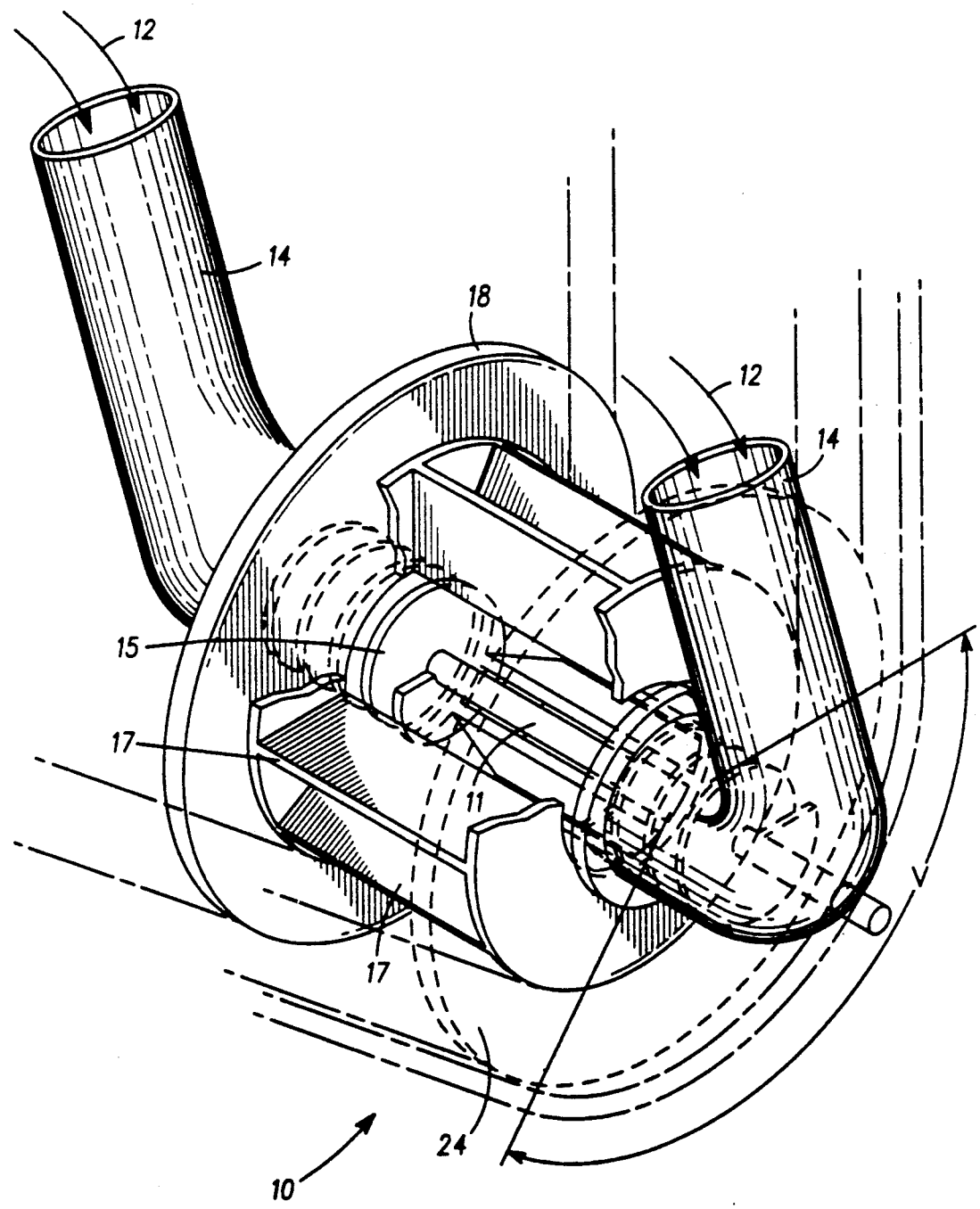
FIG. 2 shows a centrifugal force transfer device with a screw conveyor (as shown in FIG. 1A) for receiving an initial feed material from a gravity feed chute.
Figure 3:
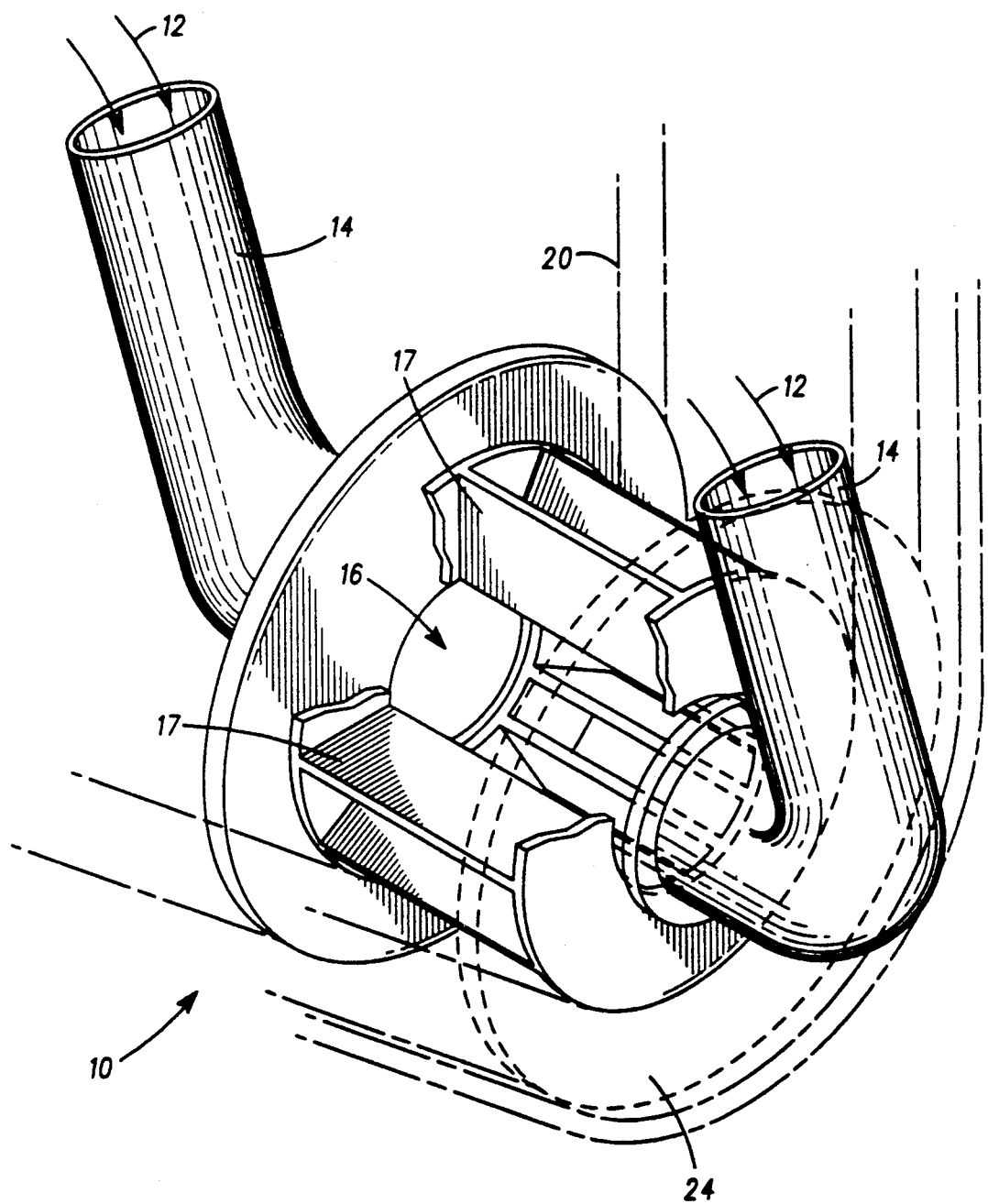
FIG. 3 illustrates a centrifugal force transfer device with a gravity feed chute and an open receiving means (as shown in FIG. 1B) for providing initial feed material.

The feed material 12 input as shown in FIG. 3 is distributed along the central longitudinal passage 16 of the conveyor transfer system 10. Means for accelerating the feed material 12, such as the internal paddle wheel 17, accelerates the feed material to a preselected velocity and substantially along a predetermined range of radial vector directions (see, for example, average angular vector D in FIG. 1B and angular vector range V in FIG. 2.) The conveyor transfer system 10 preferably includes cover housing 18 (shown in phantom in FIG. 2) to prevent undesired loss of the feed material 12 prior to achieving the prescribed velocity and predetermined range of vector direction for the transfer operation. The feed material 12 is transferred by the conveyor transfer system to means for conveying the feed material 12 to a selected location (location not shown). The conveying means can be, for example, a lift belt 20 having material conveying pockets 22.

As illustrated in FIG. 1, the lift belt 20 is a continuous conveyor belt traversing a cycle which ends by dumping at the selected location the feed material 12 accumulated in the material conveying pockets 22. The lift belt 20 has conveyor turn discs 24 which rotate on ring bearings (not shown). The lift belt 20 is engaged with a power source (not shown). The lift belt 20 recirculates along direction A and is then oriented for reloading of the material conveying pockets 22.

A conveyor pulley system includes conveyor drums 25 and 26 to turn the lift belt 20 through ninety degrees and then approximately two hundred twenty-five degrees, respectively, as shown in the example of FIGS. 1A and 1B. The pulley system is arranged to provide proper alignment of the material conveying pockets 22 relative to the conveyor transfer system 10. The conveyor drum 26 can be positioned in a conventional manner to obtain the desired tension for the lift belt 20. The feed material 12 is therefore received from the screw conveyor 15 and is accelerated to the preselected velocity. Typically the preselected velocity is chosen to be the speed of the lift belt 20 near the location where the feed material 12 is transferred to the material conveying pockets 22. This matching of velocity enables minimization of differences in velocity of the lift belt 20 and the feed material 12 being transferred.

In order to accomplish this optimum transfer (to minimize abrasion and optimize transfer efficiency), the feed material 12 is preferably transferred to the material conveying Pockets 22 within a range of radial vector angles or directions, V, shown in FIG. 2. The range of V is adjustable depending on the angular range over which the lift belt 20 and its material conveying pockets 22 are disposed in adjacent moving engagement with the paddle wheels 17 (or other such centrifugal force transfer elements). By appropriate positioning and tensioning of the conveyor drum 25 and 26, the amount of angular range where there is overlap of the moving lift belt 20 and the paddle wheels 17 can readily be adjusted.

In addition to optimizing the transfer of the feed material 12 to minimize abrasion and wear and transfer efficiency, the conveyor transfer system 10 is constructed to deliver the feed material 12 to the lift belt 20 at any variable demand level. As a consequence of being mechanically coupled in the manner shown, when the lift belt 20 (and the conveying pockets 22) increase their speed of travel, the transfer system 10 delivers the feed material 12 at the same increased rate. This is also the case for decreased demand; therefore, the delivery and removal of the feed material are always in phase with another.

In other forms of the invention the conveyor transfer system 10 can receive the feed material 12 from both directions of the longitudinal passage 16 (see FIG. 3) (or both directions along the screw conveyor 15 in FIG. 2). This would also apply equally for appropriately modified forms of either of the systems of FIGS. 1A or 1B. It is also possible to intermix two different components using the twin feed approach. This feature can thus be used even for applications in which the feed materials are different constitutes, such as dry components of cement, requiring further processing of a mixed fed material. This feature provides enhanced mixing by the dispersing and centrifugal transfer action of the conveyor transfer system 10.

While a preferred embodiment of the invention has been illustrated and described, it should be understood that changes and modifications can be made therein without departing from the invention in its broader aspects. Various features of the invention are defined in the following claims.

What is claimed is:

1. A material conveying apparatus, comprising:
   means for transporting feed material from a material source;
   means for receiving said feed material including a screw conveyor;
   a rotatable paddle wheel disposed circumferentially about the full length of said screw conveyor, said screw conveyor being longitudinally enclosed by said rotatable paddle wheel and said rotatable paddle wheel accelerating said feed material to a preselected velocity and substantially along a predetermined vector direction; and
   means for conveying to a selected location said feed material accumulated from said received means and said paddle wheel, said conveying means moving substantially at said preselected velocity and along said predetermined vector direction at least near the location where said feed material is transferred to said conveying means.

2. The material conveying apparatus as defined in claim 1 wherein said means for receiving said feed material comprises said rotatable paddle wheel for applying a centrifugal force to said material.

3. The material conveying apparatus as defined in claim 1 wherein said means for transporting said feed material comprises at least one gravity feed chute.

4. A material conveying apparatus, comprising:
   means for transporting feed material from a material source, said transporting means comprising at least two feed chutes for providing different materials;
   means for receiving and accelerating said feed material to a preselected velocity and substantially along a predetermined vector direction, said receiving and accelerating means further functioning to mix said different materials forming said feed material; and
   means for conveying said feed material to a selected location, said conveying means including movable means for accumulating said feed material received from said receiving and accelerating means and said conveying means moving substantially at said preselected velocity and along said predetermined vector direction at least near the location where said feed material is transferred from said receiving and accelerating means to said movable accumulating means.

5. The material conveying apparatus as defined in claim 4 wherein said means for conveying comprises a screw conveyor and said screw conveyor lies along about half of the longitudinal axis length of said means for receiving and accelerating said different material.

6. The material conveying apparatus as defined in claim 4 wherein said means for transporting feed material comprises at least one of said feed chutes being a gravity feed chute.

7. The material conveying apparatus as defined in claim 4 wherein said means for accelerating said feed material comprises means for applying a centrifugal force to said feed material.

8. A material conveying apparatus, comprising:
   means for transporting feed materials from a material source;
   means for receiving said feed material introduced therein using a screw conveyor having blades;
   a rotatable paddle wheel disposed circumferentially about at least a part of said blades of said screw conveyor receiving said feed material, said paddle wheel accelerating said feed material to a preselected velocity substantially along a predetermined vector direction; and means for conveying said feed material to a selected location, said conveying means including movable means for accumulating said feed material received from said receiving means and said paddle wheel and said conveying means moving substantially at said preselected velocity and along said predetermined vector direction at least near the location where said feed material is transferred from said receiving means and said paddle wheel to said movable accumulating means.

9. A vertical lift conveying apparatus, comprising:

means for transporting feed material from a material source;

a rotary loading device for receiving said feed material from said transporting means and having rotatable blades for moving said received feed material and means for rotatably redirecting said feed material substantially along a predetermined radial direction at a preselected velocity, with said rotatable blades at least partially disposed along the longitudinal axis of said rotary loading device and at least part of said blades circumferentially enclosed by said means for rotatably redirecting said feed material and said rotary loading device further including means for dispersing said feed material to said means for rotatably redirecting said feed material; and means for conveying to a selected location said feed material accumulated from said rotary loading device, said conveying means moving substantially at said preselected velocity and along said predetermined vector direction at least near the location where said feed material is transferred to said conveying means.

10. The vertical lift conveying apparatus as defined in claim 9 wherein said conveying means comprises a vertical lift conveyor.

11. The vertical lift conveying apparatus as defined in claim 9 wherein said means for rotatably redirecting said feed material comprises a substantially radially positioned paddle wheel arrangement.

12. The apparatus as defined in claim 9 wherein said means for dispersing said feed material comprises a screw conveyor.

13. A method of conveying material, comprising the steps of:

(a) transporting at least two different feed materials from a material source;

(b) receiving and centrifugally accelerating said different feed materials to a preselected velocity and substantially along a predetermined angular vector range, said centrifugal acceleration causing mixing of said different feed materials; and (c) conveying to a selected location said mixed feed material accumulated from said receiving and accelerating means, said conveying means moving substantially at said preselected velocity and along said predetermined vector direction at least near the location where said feed material is transferred to said conveying means.

14. A material conveying apparatus, comprising:

means for transporting feed material from a material source;

means for receiving said feed material from said means for transporting;

means including a paddle wheel for accelerating said feed material collected in said means for receiving, said means for receiving further including blades for moving said feed material with said blades at least partly circumferentially enclosed by said paddle wheel and said paddle wheel accelerating said feed material to a preselected velocity and substantially along a predetermined vector direction; and means for conveying to a selected location said feed material accumulated from said accelerating means, said conveying means moving substantially at said preselected velocity and along said predetermined vector direction at least near the location wherein said feed material is transferred to said conveying means.

15. The material conveying apparatus as defined in claim 14 wherein said receiving means comprises an open longitudinal passage surrounded by said paddle wheel.

16. A material conveying apparatus, comprising:

means for transporting feed material from a material source;

means for receiving said feed material including blades for moving said feed material along the longitudinal axis of said means for receiving and means for radially accelerating said feed material to a preselected velocity along a predetermined vector conveying direction, said radially accelerating means circumferentially enclosing at least part of said blades for moving said feed material; and means for conveying to a selected location said feed material accumulated from said receiving means and said means for radially accelerating, said conveying means moving at substantially the same said preselected velocity and along said predetermined vector conveying direction at the location where said feed material is transferred to said conveying means, thereby establishing a substantially zero differential speed between said means for radially accelerating and said conveying means.

* * * * *